UNITED STATES PATENT OFFICE.

ARTHUR C. SPENCER, OF WASHINGTON, DISTRICT OF COLUMBIA.

BRICK AND THE LIKE AND PROCESS OF MAKING THE SAME.

1,269,331.  Specification of Letters Patent.  Patented June 11, 1918.

No Drawing.    Application filed August 24, 1917.  Serial No. 188,053.

*To all whom it may concern:*

Be it known that I, ARTHUR C. SPENCER, a citizen of the United States, residing at Washington, in the District of Columbia, have invented certain new and useful Improvements in Bricks and the like and Processes of Making the Same, of which the following is a specification.

This invention relates to brick and the like and process of making the same; and it comprises as a new article of manufacture a brick or like shaped article for building purposes, such as hollow tiles, composed of baked greensand or glauconite granules united together by a sintered union and it further comprises a method of making such articles wherein glauconite or greensand marl is first raised to a high temperature in order to soften the granules and render them adhesive, such operation of raising to a high temperature being coupled or not as the case may be with the recovery of such potash as is evolved in the heating, and the heated or roasted granules are thereafter pressed into the desired shape; and it comprises as a new article of manufacture structural shapes such as brick, composed of pressure-welded greensand particles, with or without a binder therebetween; all as more fully hereinafter set forth and as claimed.

The object of this invention is to provide a simple, cheap and economical method of making bricks and the like having a characteristic appearance different from that of the ordinary clay bricks, and adapted for building and ornamental purposes; doing this by an economical and continuous method. To this end I heat ordinary greensand or glauconite to a high temperature; at a temperature sufficient to make it more or less plastic and then press into the desired shape; the bond between the granules in the finished article being due to the adhesive properties displayed by the heated glauconite granules.

As is well known glauconite or greensand marl is found in extensive beds in many places on the Atlantic coast of the United States and elsewhere. It is a light green mineral approximating more less in composition to a double silicate of potassium and iron. It is presumed to be of marine origin. It is found in beds of more or less pure material and is also found admixed with shell marl; that is calcium carbonate in the form of shells. The two qualities of material may be designated for the present purposes as greensand and greensand marl. Either may be employed for the present purposes. I have elsewhere (together with E. C. Eckel) disclosed and claimed a process of recovering potash from greensand wherein the greensand is run through a cement kiln under cement-forming conditions with the result of volatilizing out the potash and making what is known as ferro cement; a cement differing from an ordinary Portland cement in that ferric oxid replaces the alumina of ordinary Portland cement. In so doing, (see Patent 1,209,219) greensand is mixed with powdered limestone or the like and transmitted through a cement kiln. Here the lime displaces the potash which goes off as a fume mixed with the kiln gases and forms a clinker from which ferro cement may be made by grinding. I may utilize this prior method in the present invention, mixing greensand with the proper amount of fine ground limestone or other form of calcium carbonate and kilning the material. But instead of cooling the clinker and grinding to make a cement I take the clinker while still hot and plastic and press it into shape in a brick mold or in another mold adapted to form brick-like building material such as the ordinary hollow tiles. In so doing I recover the potash as a by-product. But instead of mixing limestone with the material in the manner just stated, I may heat the greensand as it is, either in a rotary kiln or in a stationary kiln as may be desired. In this heating if it be relatively slow and with plenty of furnace gases or steam in the atmosphere bathing the particles I can also secure potash which forms a valuable by-product. Or I may pay no attention to the potash and conduct the heating operation primarily with the object of securing plastic granules of greensand which can be agglomerated together by heat. In the heating zone the presence of more or less marl (that is shell fragments) in the material is no special disadvantage; it may indeed form a bonding agent to some extent. However, in this modification of my invention, I consider it more advantageous on the whole to take the greensand not containing much of these shell fragments.

In a specific embodiment of the present invention in making brick from greensand, if the material as it comes from the pits or excavations is not in a loose condition, I disintegrate it thoroughly. Usually I next dry it; but this drying may be done in connection with the heating step. The material, dried or undried, is next caused to pass in a traveling stream or column as the case may be through a suitably heated zone. It may, for example, be passed through a rotary kiln like those used in making Portland cement, agglomerating iron ores, etc., as a thin traveling stream passing against an opposed current of flame and flame gases. Or a column of the granular material may be passed down a suitably heated shaft. Passing it through a shaft-and-shelf furnace is less advisable because of the adhesive properties of the material when it becomes hot. The heat is regulated in this operation so that the original granules become semi-fused, at least externally, their surfaces becoming quite soft or liquid. And the movement of the stream or column is so regulated that at the time the materials emerge from the heating zone these original granules which are rather small will become sintered or clinkered together in the form of what may be called minor rounded aggregates. By careful operation I am able to control the size of these minor aggregates and produce them in fairly uniform sizes. In making brick and tile it is usually convenient to have these minor aggregates range in diameter from ⅛ to ½ inch. As a rule, and especially when produced in a rotary kiln like a cement kiln, these minor aggregates are spherical or at least rounded and their surfaces are plastic.

By placing these minor aggregates in a mold and submitting to pressure they are readily formed into what may be termed major aggregates, composed of the original granules superficially welded together. By forcing the material through a die a compact column or other shape is formed from which desired portions may be cut to produce bricks and the like. Because of the pressure the minor aggregates lose their spherical form and become ellipsoidal, or tend to become polyhedral. The shape of the mold is of course that intended for the final article. The material may be molded into bricks, tiles or various architectural shapes in any convenient manner.

In making bricks the product is a dense material resembling a "vitrified" brick of uniform hardness. The color varies according to the conditions under which the firing or heating is done. If the plasticizing of the greensand is done under freely oxidizing conditions, as in using a cement kiln with an excess of air the bricks will be yellow, brown or red; but if the firing is done under reducing conditions or if an excess of air be not employed the bricks have a deep green color. In making building brick I may use molds or dies with square corners. With paving brick (a use for which the material is very well adapted) it is better to use molds with corners rounded or beveled. The bricks made as just described are very tough and resistant, although not very hard by the sclerometer test. Harder or more flinty products may be readily obtained by the expedient of fine grinding the greensand prior to the firing; or by using a modicum of fine ground limestone or lime in admixture. Various greensands containing shells may be fine ground and fired to give a very hard or flinty brick. Where calcium carbonate, naturally present or artificially admixed, is used, it is in general much better to fine grind the material prior to firing. Hard resistant bricks may be made with moderate amounts of lime, say 2 parts CaO for every 10 parts $SiO_2$; but as a rule I think it better to employ a larger amount of lime, or its equivalent. A proportion as high as 9 parts of lime for every 10 parts of silica (as shown by analysis) in the greensand, gives a good product. Equal parts by weight of greensand and fine ground limestone, shells or the like, give a good product.

In addition to the lime or instead of it, there may be used various fluxing or bonding agents, such as fluorite, cryolite, calcium chlorid, sodium chlorid, calcium phosphate, various sulfates, etc. The presence of argillaceous or other aluminous materials in the raw mixture is also in some cases advantageous as aiding in the attainment of a proper temper of the minor aggregates giving them ready-welding characteristics.

In any method of firing there will be a certain amount of potash evolved as fume and this may be recovered by suitable methods, as by electrical precipitation, scrubbing with water, admixture of steam, and condensation, etc. In firing the greensand alone there is less evolution of potash than where it is fired in admixture with more or less lime (limestone). In either case the evolution of fume is in a measure proportional to the time during which the material is exposed to heat, and to evolve a maximum amount of potash the heating should be relatively long continued.

While I have stated more specifically a dry method of making the brick, there are certain wet methods which may also be employed. The greensand may be introduced into the kiln as a slurry, paste or dough. Using a rotary kiln, the movement of the material forms it into pellets during the drying state in the upper or feed end of the kiln. These pellets gradually progress into and through the hot zone wherein they are brought into the desired condition of incipient fusion and plasticity. Separate means may be employed for effecting the pellet formation and drying.

The bricks formed under the present invention ordinarily do not require to be annealed.

What I claim is:—

1. The process of forming bricks and other structural shapes which comprises heating a charge of material containing greensand until the particles become exteriorly softened and then compressing into shape in suitable molds.

2. The process of forming bricks and other structural shapes which comprises heating a charge of material containing greensand and a fluxing body until the particles become exteriorly softened and then compressing into shape in suitable molds.

3. The process of forming bricks and other structural shapes which comprises heating a charge of material containing greensand and lime until the particles become exteriorly softened and then compressing into shape in suitable molds.

4. The process of forming bricks and other structural shapes which comprises passing a charge comprising greensand through a rotary kiln until the surfaces of the greensand particles soften, delivering the greensand from the kiln in a hot plastic condition and compressing it into the desired shape.

5. The process of making bricks and the like which comprises passing a pulverulent charge containing greensand through a heating zone wherein said charge is brought into a state of incipient fusion and wherein plastic minor aggregates are formed, and welding such minor aggregates into shaped major aggregates.

6. The process of making bricks and the like which comprises passing a pulverulent charge containing greensand through a heating zone, bringing said charge into a state of incipient fusion in a nonoxidizing atmosphere, forming minor aggregates in said heating zone and welding such minor aggregates into shaped major aggregates.

7. The process of making bricks and the like which comprises passing a charge containing greensand through a heating zone wherein said charge is brought into a state of incipient fusion and wherein plastic minor aggregates are formed, and welding such minor aggregates into shaped major aggregates.

8. The process of forming bricks and other structural shapes which comprises heating a charge of material containing greensand and lime until the particles become exteriorly softened, forming minor aggregates and then compressing said minor aggregates into shaped major aggregates.

9. Structural shapes made of pressure welded preformed pellets, said pellets comprising sintered greensand as an essential ingredient.

10. Structural shapes composed of pressure welded preformed pellets, said pellets comprising co-sintered lime and greensand.

In testimony whereof, I affix my signature.

ARTHUR C. SPENCER.